(12) United States Patent
Isogai et al.

(10) Patent No.: US 9,361,673 B2
(45) Date of Patent: Jun. 7, 2016

(54) IMAGE INTERPOLATION DEVICE, IMAGE PROCESSING DEVICE, AND IMAGE INTERPOLATION METHOD

(71) Applicant: Panasonic Intellectual Property Management Co., Ltd., Osaka (JP)

(72) Inventors: Kuniaki Isogai, Osaka (JP); Yusuke Monobe, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/402,933

(22) PCT Filed: Jan. 22, 2014

(86) PCT No.: PCT/JP2014/000296
§ 371 (c)(1),
(2) Date: Nov. 21, 2014

(87) PCT Pub. No.: WO2014/155913
PCT Pub. Date: Oct. 2, 2014

(65) Prior Publication Data
US 2015/0161774 A1 Jun. 11, 2015

(30) Foreign Application Priority Data
Mar. 25, 2013 (JP) ................................. 2013-062447

(51) Int. Cl.
*G06K 9/36* (2006.01)
*G06T 5/00* (2006.01)
(Continued)

(52) U.S. Cl.
CPC .............. *G06T 5/005* (2013.01); *G06T 3/4007* (2013.01); *H04N 1/3935* (2013.01); *G06T 2207/20172* (2013.01); *G06T 2207/20221* (2013.01)

(58) Field of Classification Search
CPC . G06T 5/005; G06T 5/20; G06T 2207/20172; G06T 2207/20221; G06T 3/4007

USPC ......................................................... 382/283
See application file for complete search history.

(56) References Cited

U.S. PATENT DOCUMENTS 5,715,039 A * 2/1998 Fukuda et al. ................... 355/53
2003/0099406 A1* 5/2003 Georgiev et al. .............. 382/268
(Continued)

FOREIGN PATENT DOCUMENTS

JP 2006-279441 A 10/2006
JP 2008-300990 A 12/2008
(Continued)

OTHER PUBLICATIONS

International Search report for corresponding International Application No. PCT/JP2014/000296 mailed Apr. 28, 2014.
(Continued)

*Primary Examiner* — Ali Bayat
(74) *Attorney, Agent, or Firm* — Renner, Otto, Boisselle & Sklar, LLP (57) ABSTRACT

An image interpolation apparatus includes: a first processing unit which calculates an error on image data between a patch to be interpolated that overlaps with a masked region and a reference patch that does not overlap with the masked region; a second processing unit which calculates, based on the image data, feature quantities indicating the degrees of flatness of the respective patch regions; a third processing unit which calculates an error between their feature quantities; a fourth processing unit which selects a reference patch that has produced a least significant error based on results obtained by the first and third processing units; and a fifth processing unit which pastes pixel data of the reference patch that the fourth processing unit has selected onto the patch to be interpolated. The third processing unit calculates an error between the feature quantities by comparing the feature quantity of the patch to be interpolated outside of the masked region to that of the entire reference patch.

9 Claims, 10 Drawing Sheets

(51) Int. Cl.
 *H04N 1/393* (2006.01)
 *G06T 3/40* (2006.01)

(56) References Cited

U.S. PATENT DOCUMENTS

2006/0232608 A1* 10/2006 Riaz .............................. 345/642
2009/0297059 A1* 12/2009 Lee et al. ...................... 382/275
2012/0230591 A1   9/2012 Shibata
2013/0016246 A1*  1/2013 Hatanaka et al. .......... 348/222.1

FOREIGN PATENT DOCUMENTS

| JP | 2010-154319 A | 7/2010 |
| JP | 2011-170840 A | 9/2011 |
| WO | WO 2009/142333 A1 | 11/2009 |
| WO | WO 2011/061943 A1 | 5/2011 |

OTHER PUBLICATIONS

M. Bertalmio et al., "Image Inpainting", SIGGRAPH 2000.

A. Criminisi et al., "Region Filling and Object Removal by Exemplar-Based Image Inpainting", IEEE Transactions on Image Processing, vol. 13, No. 9, Sep. 2004, pp. 1-13 (pp. 1200-1212).

* cited by examiner

IMAGE INTERPOLATION DEVICE, IMAGE PROCESSING DEVICE, AND IMAGE INTERPOLATION METHOD

TECHNICAL FIELD

The present disclosure relates to an image interpolation apparatus, image processing apparatus and image interpolation method.

BACKGROUND ART

A photo shot may sometimes have captured an unnecessary object for the shooter. For example, if the photo has captured unintentionally the face of a stranger who has happened to pass by, an image region representing his or her face needs to be hidden by either filling or pixelization so as to prevent the viewers from identifying him or her when the photo is exposed to general public. As another example, if a person has captured an annoying object which destroys the beauty of the scene he or she has shot, he or she may want to erase that object in some way or other in order to restore the beauty of the photo shot. However, it will take a lot of time and trouble to get such image editing job done manually, and therefore, the quality of the resultant image will heavily depend on the person's skill. For that reason, there is a growing demand for an image interpolating technique for removing such an unwanted object automatically.

According to a conventional image interpolation method, a region of interest on a photo which includes some flaw or superimposed letters to remove is interpolated smoothly by propagating pixel values in surrounding regions over and over again (see Non-Patent Document No. 1, for example). On the other hand, Non-Patent Document No. 2 proposes a "patch matching" technique for making interpolation so that multiple image regions can be merged together continuously and seamlessly by searching for a similar texture region on the basis of a rectangular region called a "patch". Meanwhile, Patent Document No. 1 teaches estimating the texture in a masked region.

CITATION LIST

Patent Literature

Patent Document No. 1: PCT International Application Publication No. 2011/061943

Non-Patent Literature

Non-Patent Document No. 1: M. Bertalmio, G. Sapiro, C. Ballester, and V. Caselles, "Image Inpainting", SIGGRAPH 2000.

Non-Patent Document No. 2: A. Criminisi, P. Perex, and K. Toyama, "Region Filling and Object Removal by Exemplar-Based Image Inpainting", IEEE Transactions on Image Processing, pp. 1200-1212, Vol. 13, No. 9, 2004.

SUMMARY OF INVENTION

Technical Problem

According to the technique of Non-Patent Document No. 1, if the region to be interpolated has a large area, then fine texture information will be lost, which is a problem. Meanwhile, the technique disclosed in Non-Patent Document No. 2 is a matching-based processing method. That is why if an inappropriate patch has been selected and pasted onto the region to be interpolated, then the viewer will find the result of such interpolation very unnatural, which is also a problem. Furthermore, according to the technique of Patent Document No. 1, the shape of a texture needs to be estimated. Thus, if the texture in question is too complex to estimate its shape accurately, then such a failure in estimation will prevent the user from getting the interpolation done successfully, which is a situation to avoid.

Embodiments of the present disclosure provide an image interpolation apparatus and image interpolation method which contributes to improving the image quality by interpolation.

Solution To Problem

An image interpolation apparatus according to the present disclosure includes: a first processing unit which receives image data and information defining a masked region of the image data to be subjected to interpolation processing and which calculates an error on the image data between a patch to be interpolated that overlaps with the masked region and a reference patch that does not overlap with the masked region; a second processing unit which calculates, based on the image data, feature quantities indicating the degrees of flatness of the respective patch regions; a third processing unit which calculates an error between their feature quantities; a fourth processing unit which selects a reference patch that has produced a least significant error based on results obtained by the first and third processing units; a fifth processing unit which pastes pixel data of the reference patch that the fourth processing unit has selected onto the patch to be interpolated; and an image output section which outputs resultant image data obtained as a result of the interpolation processing. The third processing unit calculates an error between the feature quantities by comparing the feature quantity of the patch to be interpolated outside of the masked region to the feature quantity of the entire reference patch.

Another image processing apparatus according to the present disclosure performs the steps of: (i) receiving image data and information defining a masked region of the image data to be subjected to interpolation processing and calculating an error on the image data between a patch to be interpolated that overlaps with the masked region and a reference patch that does not overlap with the masked region; (ii) calculating, based on the image data, feature quantities indicating the degrees of flatness of the respective patch regions; (iii) calculating an error between their feature quantities; (iv) selecting a reference patch that has produced a least significant error based on results obtained in the steps (i) and (iii); (v) pasting pixel data of the reference patch that has been selected in the step (iv) onto the patch to be interpolated; and (vi) generating resultant image data as a result of the interpolation processing. The step (iii) includes calculating the error between their feature quantities by comparing the feature quantity of the patch to be interpolated outside of the masked region to the feature quantity of the entire reference patch.

An image interpolation method according to the present disclosure includes the steps of: (i) receiving image data and information defining a masked region of the image data to be subjected to interpolation processing and calculating an error on the image data between a patch to be interpolated that overlaps with the masked region and a reference patch that does not overlap with the masked region; (ii) calculating, based on the image data, feature quantities indicating the degrees of flatness of the respective patch regions; (iii) calculating an error between their feature quantities; (iv) selecting a reference patch that has produced a least significant error based on results obtained in the steps (i) and (iii); (v) pasting pixel data of the reference patch that has been selected in the step (iv) onto the patch to be interpolated; and (vi) generating resultant image data as a result of the interpolation processing. The step (iii) includes calculating the error between their feature quantities by comparing the feature quantity of the patch to be interpolated outside of the masked region to the feature quantity of the entire reference patch.

Advantageous Effects of Invention

According to the image interpolation apparatus, image processing apparatus and image interpolation method of the present disclosure, a result of interpolation which looks much less unnatural to the user can be obtained.

BRIEF DESCRIPTION OF DRAWINGS

FIGS. 3(a) and (b) illustrate what a problem with the patch matching technique is.

DESCRIPTION OF EMBODIMENTS

Before embodiments of the present disclosure are described, first of all, the basic configuration of an image interpolation apparatus which adopts a patch matching technique will be described. This basic configuration itself is disclosed in Non-Patent Document No. 2.

Figure 1:
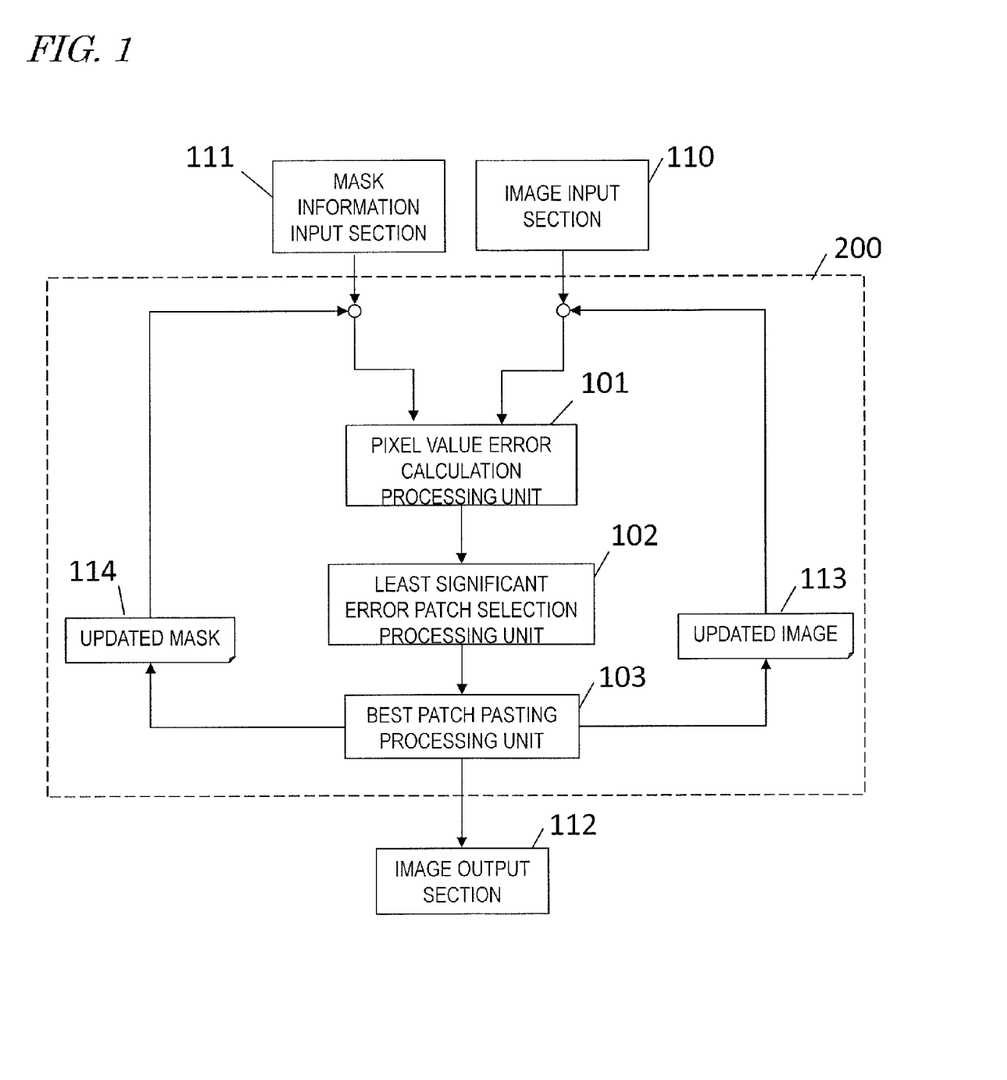
FIG. 1 Illustrates an overall configuration for an image interpolation apparatus which adopts a patch matching technique.

FIG. 1 illustrates an exemplary configuration for an image interpolation apparatus which adopts the patch matching technique. In the exemplary configuration shown in FIG. 1, image data that is the object of image interpolation processing (which will be hereinafter simply referred to as "interpolation processing") is entered from an image input section 110 into this image interpolation apparatus 200. Meanwhile, mask information which is data specifying a target region (which will be hereinafter simply referred to as a "target") of the image data to be subjected to the interpolation processing is entered from a mask information input section 111 into this image interpolation apparatus 200.

In this description, a target region to be specified by reference to the mask information will be hereinafter referred to as a "masked region", which may be set either manually or automatically so as to include the target that should be deleted from the image. Also, the smallest unit region representing the textural features of an image will be hereinafter referred to as a "texture element" and a region which is larger in size than the texture element is selected as a "patch", which is typically a rectangular macroblock region and which may have a size larger than 8×8 pixels, for example. Also, the size of a patch may account for less than 1% of the number of pixels of the entire image, for example. Of the image data that has been entered from the image input section 110, a region including the target to be removed is selected and masked as the target of the interpolation processing. This masked region will be interpolated based on patches which are located in the non-masked region (which will be hereinafter referred to as a "surrounding region").

A pixel value error calculation processing unit 101 compares a "patch overlapping with a masked region locally" (which will be hereinafter simply referred to as a "patch overlapping with a masked region") to a "patch in the surrounding region", thereby calculating a pixel value error. More specifically, the pixel value error calculation processing unit 101 selects a single "patch overlapping with the masked region" and compares, one after another, that patch to a number of patches which are located in the region surrounding that patch and which do not overlap with the masked region. The error may be calculated by the known SSD (sum of squared differences) or SAD (sum of absolute differences) method, for example. In this manner, the error is calculated for each of a number of patches in the surrounding region. Once the error has been obtained, another patch is selected as a patch overlapping with the masked region. In this way, the error is calculated in each and every pair of patches that consists of a patch overlapping with the masked region and a patch in the surrounding region.

A least significant error patch selection processing unit 102 selects a combination of patches that has produced the least significant error from multiple pairs of patches. Next, a best patch pasting processing unit 103 pastes the image data of the patch in the surrounding region that has produced the least significant error into the patch overlapping with the masked region. An updated image 113 to which patch data has been pasted and an updated mask 114 are entered into the pixel value error calculation processing unit 101. After that, the same series of processing steps will be performed over and over again until there is no updated mask 114 anymore. And when that happens, an image representing the final result of processing will be output from an image output section 112.

Next, it will be described with reference to FIGS. 2(a) through 2(d) how the image interpolation apparatus operates when the patch matching technique disclosed in Non-Patent Document No. 2 is adopted.

Figure 2:
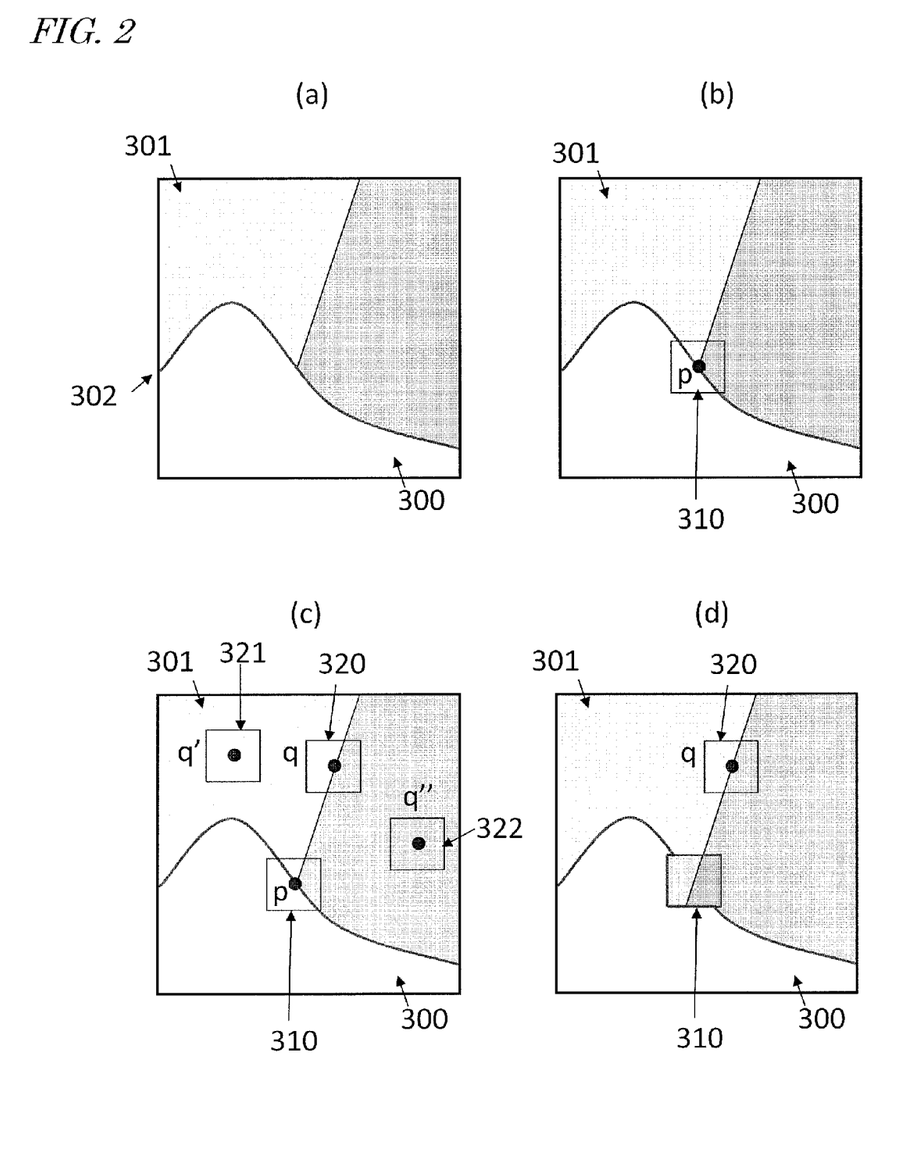
FIGS. 2(a) to (d) show how to make interpolation according to the patch matching technique.

First of all, as shown in FIG. 2(a), a masked region 300 to be subjected to interpolation processing is specified on the image data. In this example, the image is split into two regions by a boundary line which runs straight obliquely. The masked region 300 is a region to be interpolated which has been set either manually or automatically as described above. In the example illustrated in FIG. 2, the masked region 300 has been set so as to cross the straight boundary line that splits the background into two regions and has a hill shape. In the following description, the rest of the image other than the masked region 300 will be hereinafter referred to as a "non-masked region 301" and the boundary line between the masked region 300 and the non-masked region 301 will be hereinafter referred to as a "mask boundary 302".

Next, a patch overlapping with the masked region 300 is selected as a target patch and the non-masked region 301 in the image data is searched for a patch to be pasted onto the target patch. As shown in FIG. 2(b), if a part of the target patch 310, of which the center is located at a point P on the mask boundary 302 and which overlaps with the masked region 300 partially, is going to be interpolated, a patch which is most similar to the rest of the target patch 310 other than that part overlapping with the masked region 300 is searched for and pasted. In the example illustrated in FIG. 2(b), the rest of the target patch 310 except that part overlapping with the masked region 300 overlaps with the two regions that have been split by the boundary line.

As shown in FIG. 2(c), the error is calculated between the target patch 310 and each of reference patches 320, 321 and 322, of which the centers are respectively located at points q, q' and q" in the non-masked region 301, and one of these reference patches that has produced the least significant error is selected. More specifically, the error is calculated between the rest of the target patch 310 other than that part overlapping with the masked region 300 and a part of each of the reference patches 320, 321 and 322 corresponding to the rest of the target patch 310 except that part overlapping with the masked region 300. If the reference patch 320 has been selected as shown in FIG. 2(d), then pixel value of the reference patch 320 is pasted onto the target patch 310. Just like the rest of the target patch 310 other than the part overlapping with the masked region 300, the reference patch 320 also overlaps with the two regions that have been split by the boundary line.

Next, the target patch 310 is removed from the masked region 300 and then the mask boundary 302 is updated. By performing this series of processing steps over and over again until there is no masked region 300 left, the masked region 300 is interpolated with the texture of the non-masked region 301.

According to this patch matching technique, a reference patch 320 with a linear structure that the texture of the background would have when the object is removed from the masked region 300 is selected and used for making an interpolation. For that reason, the linear structure of the texture is reproduced as a result of the interpolation processing as shown in FIG. 2(d).

However, the present inventors discovered that the patch matching technique described above has the following problem.

That problem will now be described with reference to FIGS. 3(a) and 3(b), which illustrate how to select a reference patch according to the patch matching technique described above.

In this example, a masked region 400 in a right triangular shape has been set, and there is a circular texture 401 in some region other than the masked region 400. Also, as shown in FIG. 3(a), a target patch 410 overlapping with the masked region 400 partially has been selected and is now compared to a reference patch 420 overlapping with the texture 401 just partially. The target patch 410 crosses the boundary between the masked region 400 and the non-masked region. That is why this target patch 410 can be divided into a part located inside of the masked region 400 and a part located outside of the masked region 400. The former part of the target patch 410 that is located inside of the masked region 400 will be hereinafter referred to as a "target patch's in-mask part 411". The latter part of the target patch 410 that is located outside of the masked region 400 will be hereinafter referred to as a "target patch's out-of-mask part 412".

Figure 3:
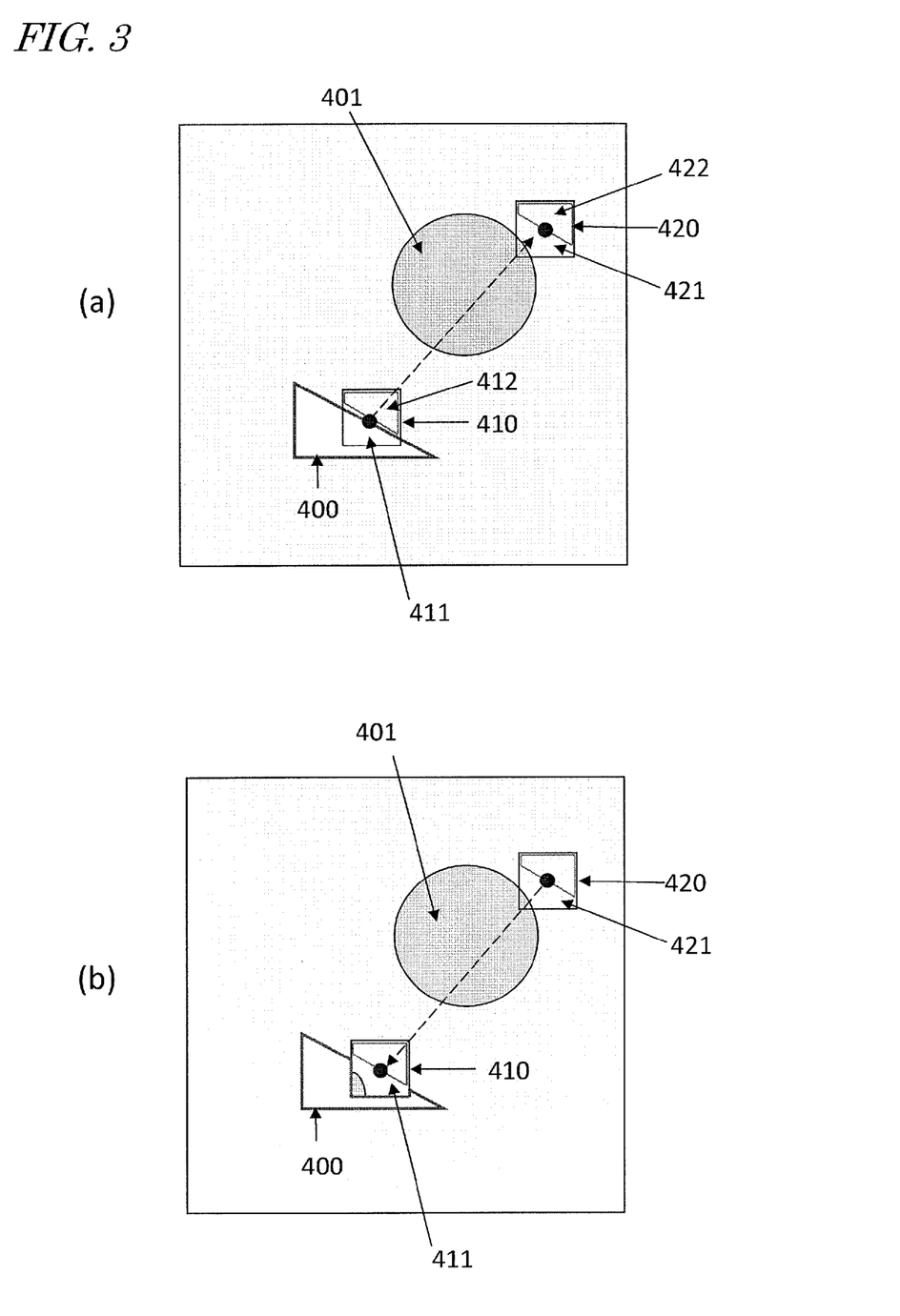

Meanwhile, the reference patch 420 shown in FIG. 3(a) may also be divided into a "reference patch's in-mask part 421" corresponding to the "target patch's in-mask part 411" of the target patch 410 and a "reference patch's out-of-mask part 422" corresponding to the "target patch's out-of-mask part 412".

In calculating the error between the target patch 410 and reference patch 420 shown in FIG. 3(a), the target patch's in-mask part 411 of the target patch 410 which falls within the masked region 400 is not used to compare these two patches to each other. That is to say, the error between the two patches is calculated by comparing the target patch's out-of-mask part 412 and the reference patch's out-of-mask part 422 to each other. That is why the texture in the reference patch's in-mask part 421 of the reference patch 420 is not considered. For that reason, even if the reference patch's in-mask part 421 of the reference patch 420 includes just a part of the circular texture 401 as shown in FIG. 3(a), that does not affect the calculation of the error.

Consequently, when the reference patch 420 is selected, the texture of the reference patch's in-mask part 421 will be mapped as it is to the target patch's in-mask part 411 as shown in FIG. 3(b). That is to say, a part of the texture 401 will be pasted onto a part of the masked region 400, thus making the result of the interpolation inappropriate in some cases.

Figure 4:
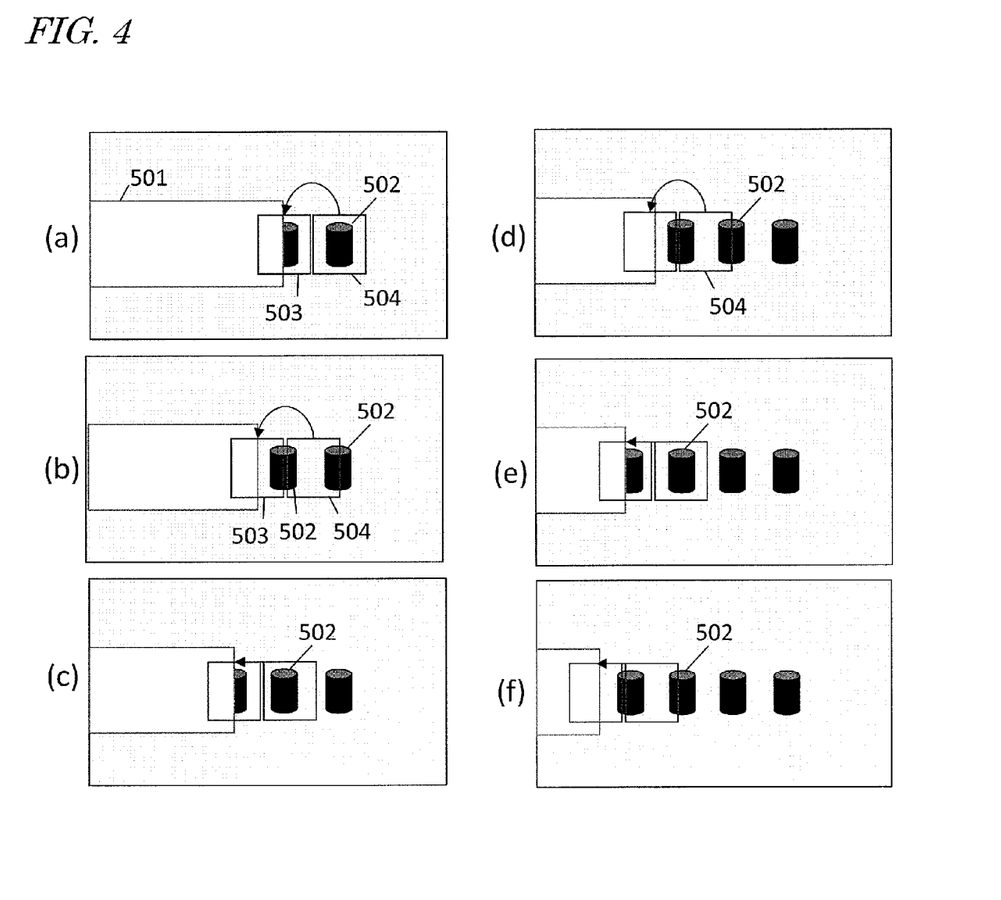
FIGS. 4(a) to (f) illustrate what problem will arise if the same patch is pasted over and over again.

In addition, according to the patch matching technique, the same patch may be selected and pasted into the masked region a number of times. In the example illustrated in FIGS. 4(a) to 4(f), first of all, a reference patch 504 including a texture 502 is selected as a patch to be pasted onto a target patch 503 which overlaps with a masked region 501 partially. Next, as shown in FIG. 4(b), the reference patch 504 is pasted onto the target patch 503. In this manner, the same texture 502 may be pasted over and over again, thus making the result of the interpolation unnatural in some cases as shown in FIGS. 4(a) to 4(f). Particularly, in an image with no periodic texture such as an image shot in Nature, such a part to which the same texture has been pasted a number of times periodically will look quite unnatural.

Embodiments of the present disclosure provide an image interpolation apparatus which contributes to overcoming such a problem by producing a high-quality result of interpolation.

Embodiments of the present disclosure will now be described in further detail.

Embodiments

Figure 5A:
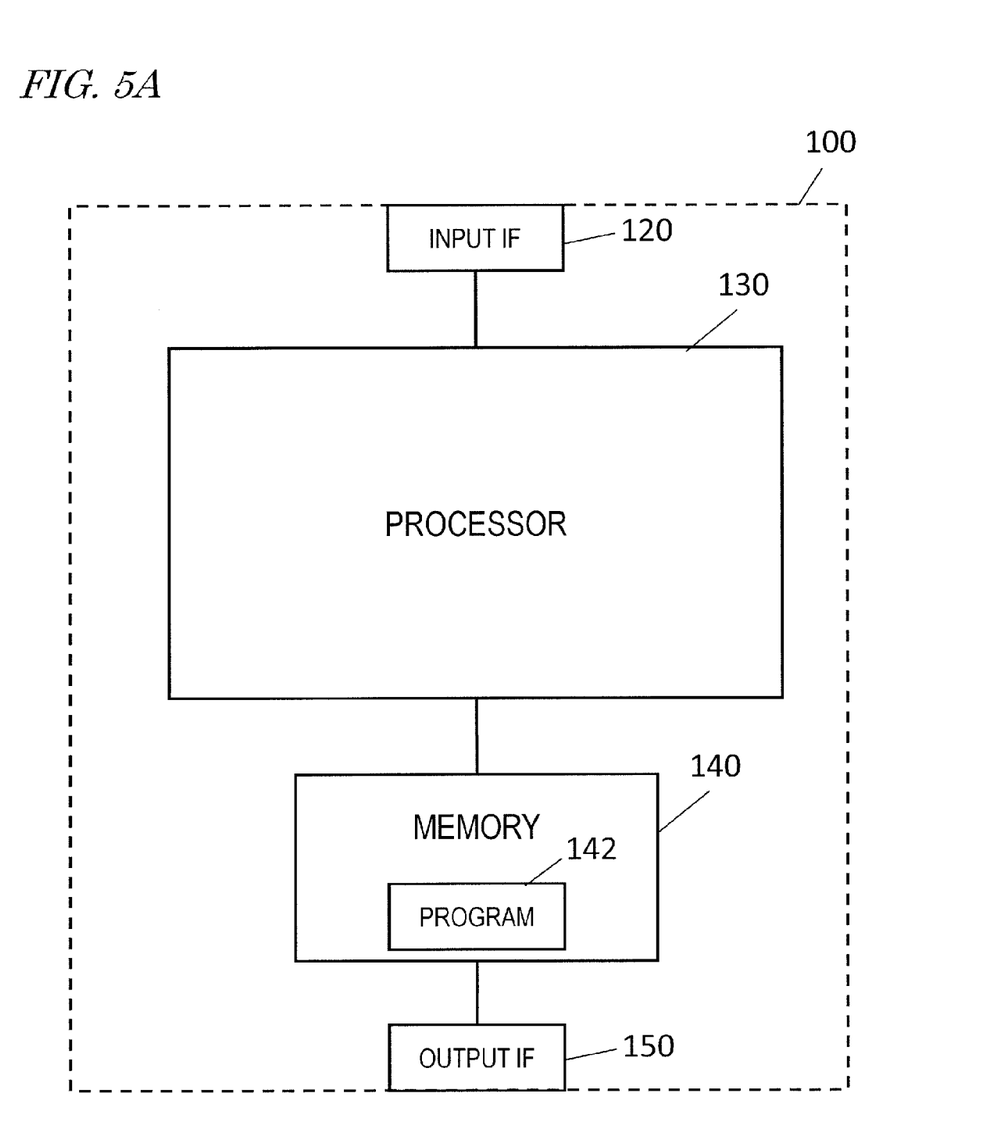
FIG. 5A A block diagram illustrating a hardware configuration for an image interpolation apparatus as an embodiment of the present disclosure.

FIG. 5A is a block diagram illustrating a hardware configuration for an image interpolation apparatus as an embodiment of the present disclosure. As shown in FIG. 5A, this image interpolation apparatus 100 includes an input interface (IF) 120, a processor 130, a memory 140, and an output interface (IF) 150. The memory 140 stores a computer program 142 which defines an image processing method according to this embodiment. By making the processor 130 execute the program 142, various kinds of processing to be described below can be performed.

Figure 5B:
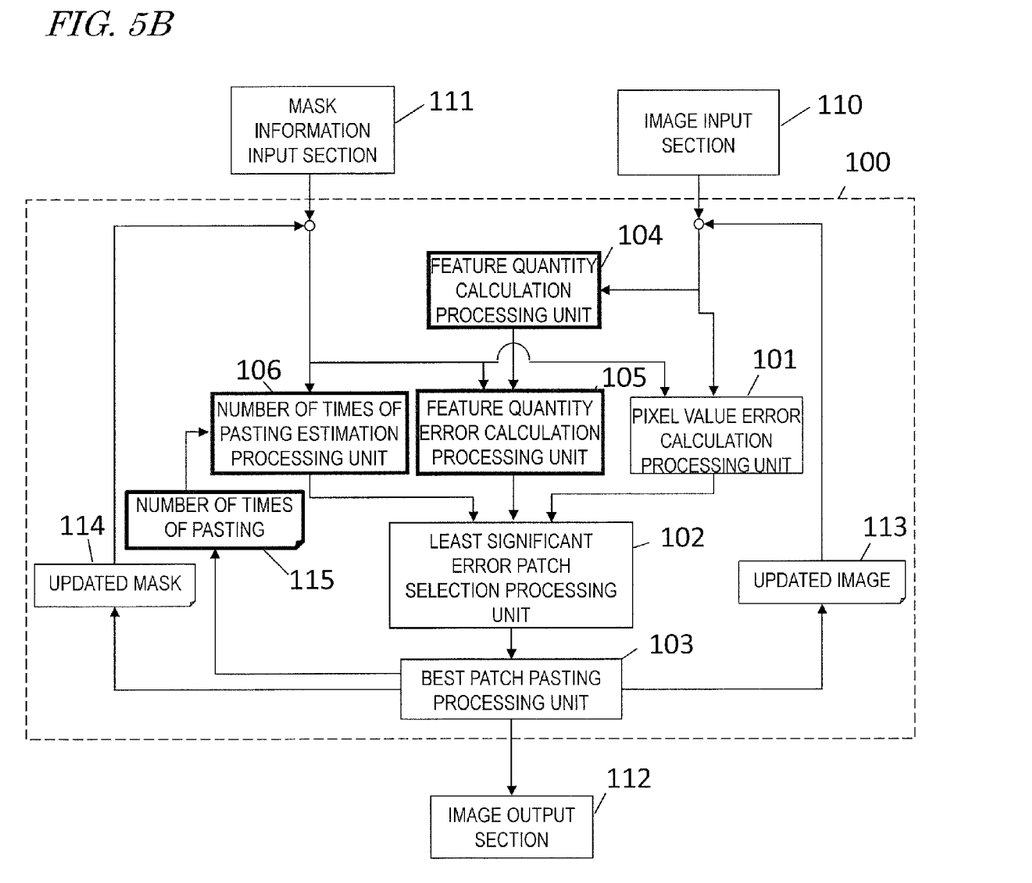
FIG. 5B A block diagram illustrating functional blocks of the image interpolation apparatus according to the embodiment of the present disclosure.

FIG. 5B is a block diagram illustrating functional blocks of the image interpolation apparatus according to this embodiment. In FIG. 5B, any component also shown in FIG. 1 and having substantially the same function as its counterpart is identified by the same reference numeral as its counterpart's and will not be described all over again. The details (such as algorithm) of the same components as the ones shown in FIG. 1 are disclosed in Non-Patent Document No. 2, the entire disclosure of which is hereby incorporated by reference.

This image processing apparatus 100 includes not only the components shown in FIG. 1 but also a feature quantity calculation processing unit 104, a feature quantity error calculation processing unit 105, and a number of times of pasting estimation processing unit 106. In this description, the pixel value error calculation processing unit 101, feature quantity calculation processing unit 104, feature quantity error calculation processing unit 105, least significant error patch selection processing unit 102, best patch pasting processing unit 103 and number of times of pasting estimation processing unit 106 will be sometimes hereinafter referred to as first, second, third, fourth, fifth and sixth processing units, respectively. Each of these first through sixth processing units can be implemented by combining the computer program 142 which is designed to perform the operations to be described later with a single or a plurality of processors 130. It should be noted that these first through sixth processing units do not always have to be provided as separate parts. Instead, a single image processing apparatus comprised of either a single part or a set of parts may operate as those multiple processing units. As can be seen, each or all of these first through sixth processing units may be implemented as a combination of hardware and software.

The image interpolation apparatus 100 shown in FIG. 5B is connected to an image input section 110 which receives image data and to a mask information input section 111 which receives information about the range of a masked region in which the image data is subjected to interpolation processing. The input interface 120 shown in FIG. 5A gets image data from the image input section 110 and gets mask information from the mask information input section 111. The image input section 110 may be an external storage medium or information device which stores image data to be interpolated, for example. The mask information input section 111 may include a user interface which allows the user to specify the range of the masked region and a processing circuit which defines the masked region by applying a predetermined algorithm to a given image.

In the exemplary configuration shown in FIG. 5B, the feature quantity calculation processing unit 104 gets the image data which has been loaded from the image input section 110 and calculates a feature quantity representing the degree of flatness of the texture. The feature quantity may be edge intensity shade data which is a result obtained by subjecting given image data to edge detection processing using a Sobel filter, for example.

Figure 6:
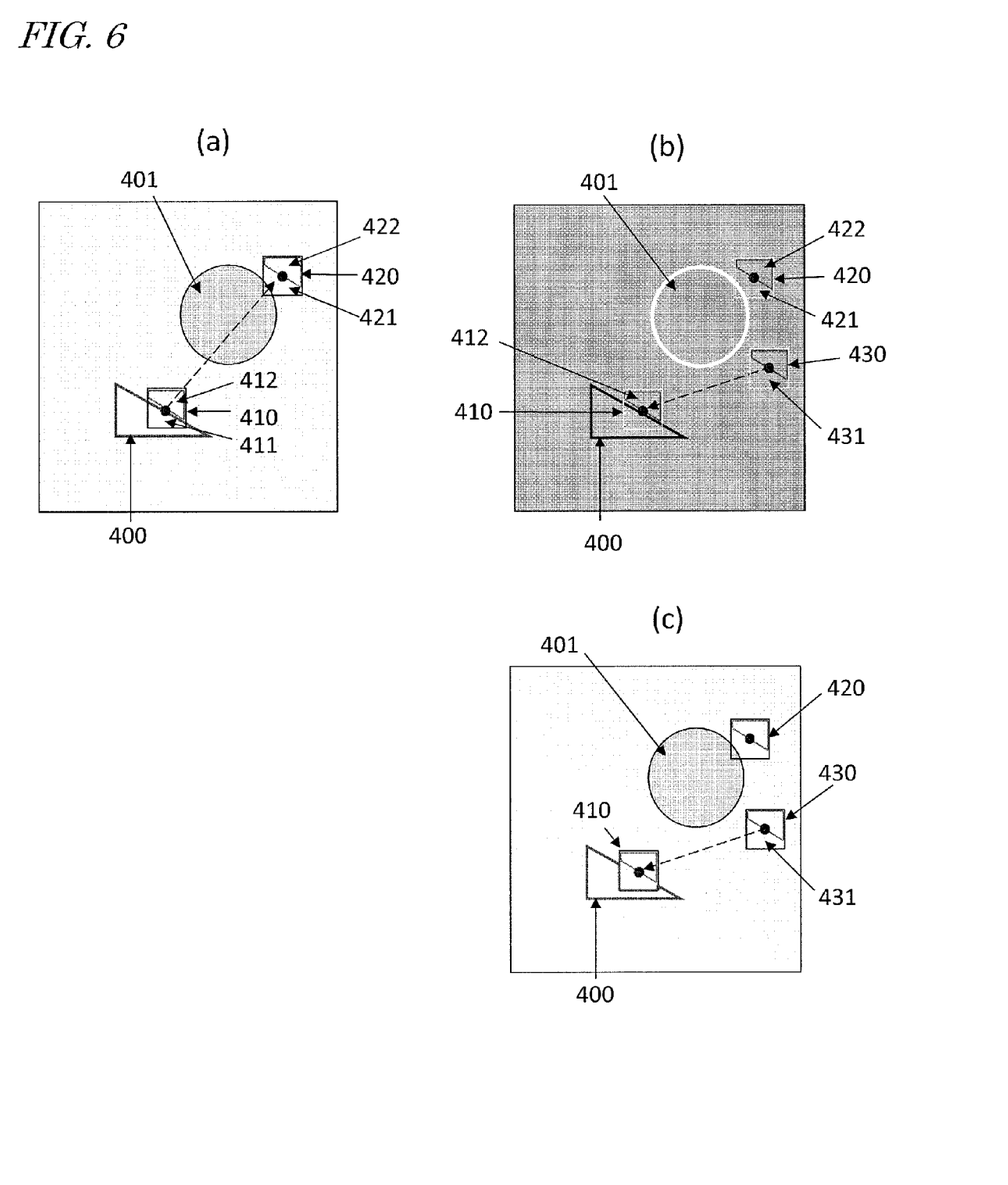
FIGS. 6(a) to (c) illustrate how to compare patches based on image feature quantities according to an embodiment of the present disclosure.

Now take a look at FIGS. 6(a) and 6(b). FIG. 6(a) corresponds to FIG. 3(a). As in FIG. 3(a), a masked region 400 in the shape of a right triangle has also been set in FIG. 6(a). In addition to the masked region 400, a circular texture 401 has also been set somewhere else. As described above, the target patch 410 is comprised of a target patch's in-mask part 411 and a target patch's out-of-mask part 412. FIG. 6(b) illustrates an exemplary feature quantity obtained by performing the edge detection processing. In FIG. 6(b), the grey area represents an area with a flat texture. The white circle indicating the profile of the texture 401 corresponds to the texture's edge portion and represents a non-flat area. Meanwhile, the profile of the masked region 400 does not correspond to a texture edge, and therefore, the feature quantity is calculated on the supposition that the masked region's profile is a flat area.

Alternatively, the feature quantity may also be a blurred version of the edge intensity shade data which is obtained by subjecting the edge intensity shade data to some filter operation using a Gaussian filter, for example. Still alternatively, either an average or a variance may be obtained on a small region basis from the edge intensity shade data and that variance may be used as the feature quantity. Yet alternatively, either the average or variance of luminance data may be obtained from the image data and may be used as the feature quantity.

Now look at FIG. 5B again. The feature quantity error calculation processing unit 105 calculates an error in feature quantity between the patches based on the feature quantity provided by the feature quantity calculation processing unit 104 and the mask information loaded from the mask information input section 111. In this embodiment, the feature quantity of the target patch's out-of-mask part 412 is compared to the feature quantity of the entire reference patch 420 (i.e., the reference patch's in-mask part 421+ the reference patch's out-of-mask part 422) as shown in FIG. 6(b). In this case, both the target patch's out-of-mask part 412 and the reference patch's out-of-mask part 422 have a flat texture, and therefore, both of their feature quantities come to have an insignificant value. On the other hand, the reference patch's in-mask part 421 does include an edge portion of the texture 401, and therefore, the feature quantity (such as the "edge intensity") comes to have a significant value. As a result, there will be a significant error in feature quantity between the target patch 410 and the reference patch 420. It should be noted that another reference patch 430 which is located away from the texture 401 is also shown in FIG. 6(b). The reference patch's in-mask part 431 of the reference patch 430 has a flat texture. The reference patch 430, of which the reference patch's in-mask part 431 has a flat texture, causes a less significant feature quantity error than the reference patch 420 does. That is why in this embodiment, the reference patch 430 will be selected and pasted onto the target patch 410 as shown in FIG. 6(c).

Look at FIG. 5B once again. The image interpolation apparatus 100 of this embodiment further includes a number of times of pasting estimation processing unit 106. Although the number of times of pasting estimation processing unit 106 is not an essential component to carry out the image processing of the present disclosure, the effects to be described below can be produced by using the number of times of pasting estimation processing unit 106.

Specifically, the number of times of pasting estimation processing unit 106 of this embodiment gets the mask information that has been loaded from the mask information input section 111 and also gets the number of times of patch pasting 115. And the number of times of pasting estimation processing unit 106 calculates a penalty value so that the larger the number of times a reference patch has been pasted to a region, the more significant the error will be when patches are compared to each other. That is to say, as the same patch is selected over and over again, it gradually gets more and more difficult to select that patch. For that reason, such a situation where the same patch is pasted over and over again needs to be avoided. The number of times of patch pasting 115 is recorded and updated by the best patch pasting processing unit 103 every time a patch is pasted.

Next, specific processing will be described with reference to FIGS. 7(a) through 7(h). In the example illustrated in FIG. 7(a), suppose a reference patch 603 in a region (X5: X6, Y3: Y4) has been selected as the best patch with respect to a target patch 602 in a region (X2: X3, Y2: Y3). In this case, the region (X2: X3, Y2: Y3) refers herein to a rectangular region consisting of four pixels which are located at the coordinates (X2, Y2), (X3, Y2), (X2, Y3), and (X3, Y3). The pixels in the reference patch's (603) in-mask region (X5, Y3: Y4) associated with the region (X2, Y2: Y3) belonging to the target patch's (602) masked region 601 are pasted onto that region (X2, Y2: Y3).

Figure 7:
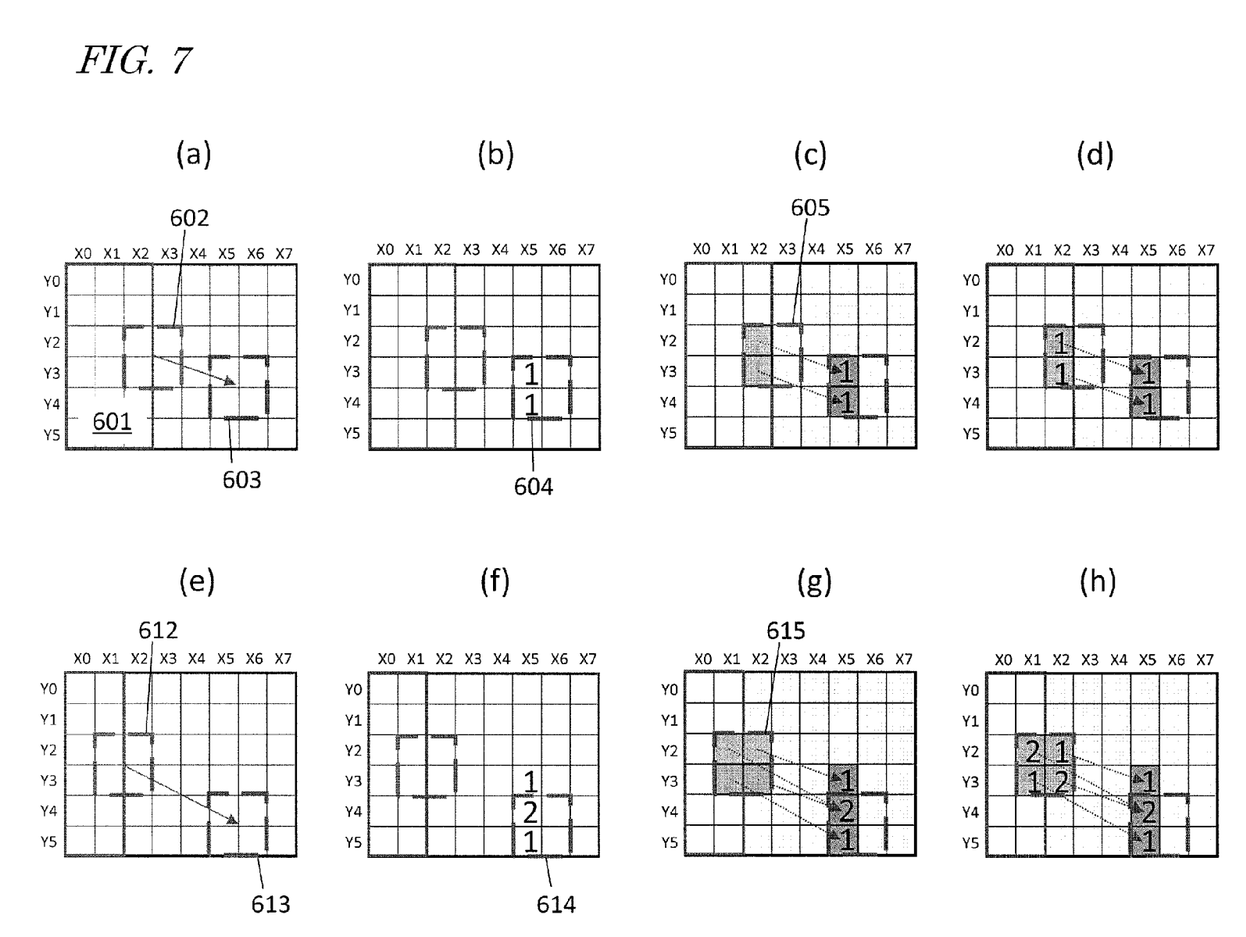
FIGS. 7(a) to (h) illustrate how to record how many times a patch has been pasted according to an embodiment of the present disclosure.

As shown in FIG. 7(b), the number of times 604 the pixels have been pasted as a texture is recorded on the region (X5, Y3:Y4) that is the origin of pasting. Furthermore, as shown in FIG. 7(c), reference links 605 indicating where the pixels pasted have come from are also recorded. Specifically, the reference link 605 in the region (X2, Y2) indicates that the pixels have come from the region (X5, Y3) and the reference link 605 in the region (X2, Y3) indicates that the pixels have come from the region (X5, Y4). As shown in FIG. 7(d), the number of times that the texture has been pasted onto the region (X2, Y2) is as many as the number of times of pasting indicated in the region (X5, Y3) and the number of times that the texture has been pasted onto the region (X2, Y3) is as many as the number of times of pasting indicated in the region (X5, Y4).

Next, suppose a reference patch 613 in a region (X5: X6, Y4: Y5) has been selected as the best patch with respect to a target patch 612 in a region (X1: X2, Y2: Y3) as shown in FIG. 7(e). In that case, the number of times of pasting 614 indicated in the region (X5, Y4) is incremented by one to be "2" and the number of times of pasting 614 indicated in the region (X5, Y5) becomes "1" as shown in FIG. 7(f). In addition, as shown in FIG. 7(g), a reference link 615 indicating the region (X5, Y4) is formed in the region (X1, Y2) and a reference link 615 indicating the region (X5, Y5) is formed in the region (X1, Y3). In this case, the regions (X1, Y2) and (X2, Y3) both have a link to the same region (X5, Y4). That is why as shown in FIG. 7(h), the number of times of pasting onto the region (X2, Y3) is set to be "2" indicating the number of times of pasting onto the region (X5, Y4).

Suppose a patch has a flat texture. In that case, even if the patch is pasted over and over again, the result of interpolation will not be an unnatural one. That is why if the region of interest is flat (e.g., if the feature quantity value is equal to or smaller than a predetermined threshold value), then the penalty value to output may be decreased based on the feature quantity indicating the degree of flatness of a patch that has been obtained by the feature quantity calculation processing unit 104. Also, if the feature quantity value needs to be decreased as the degree of flatness of a given region increases, the product of the penalty value and the feature quantity value may be output.

Now take a look at FIG. 5B again. The image interpolation apparatus 100 of this embodiment further includes a least significant error patch selection processing unit 102. The least significant error patch selection processing unit 102 of this embodiment receives the pixel value error provided by the pixel value error calculation processing unit 101, the feature quantity error provided by the feature quantity error calculation processing unit 105, and the penalty provided by the number of times of pasting estimation processing unit, and selects, as the best patch to be pasted onto the target patch region, a reference patch in which the sum of these three input values becomes the smallest.

Optionally, in calculating the sum of these three input values, each of the three values may be multiplied by a preset weight. Alternatively, the best patch may also be determined by using either only one of the three values or any two of the three in combination. In that case, error calculation processing and estimation processing for the value(s) not to be used may be omitted.

Unless the image interpolation apparatus 100 includes the number of times of pasting estimation processing unit 106, the least significant error patch selection processing unit 102 receives the pixel value error provided by the pixel value error calculation processing unit 101 and the feature quantity error provided by the feature quantity error calculation processing unit 105, and selects, as the best patch to be pasted onto the target patch region, a reference patch in which either the sum of these two input values or the sum of the products of these two input values by a preset weight becomes the smallest.

Figure 8:
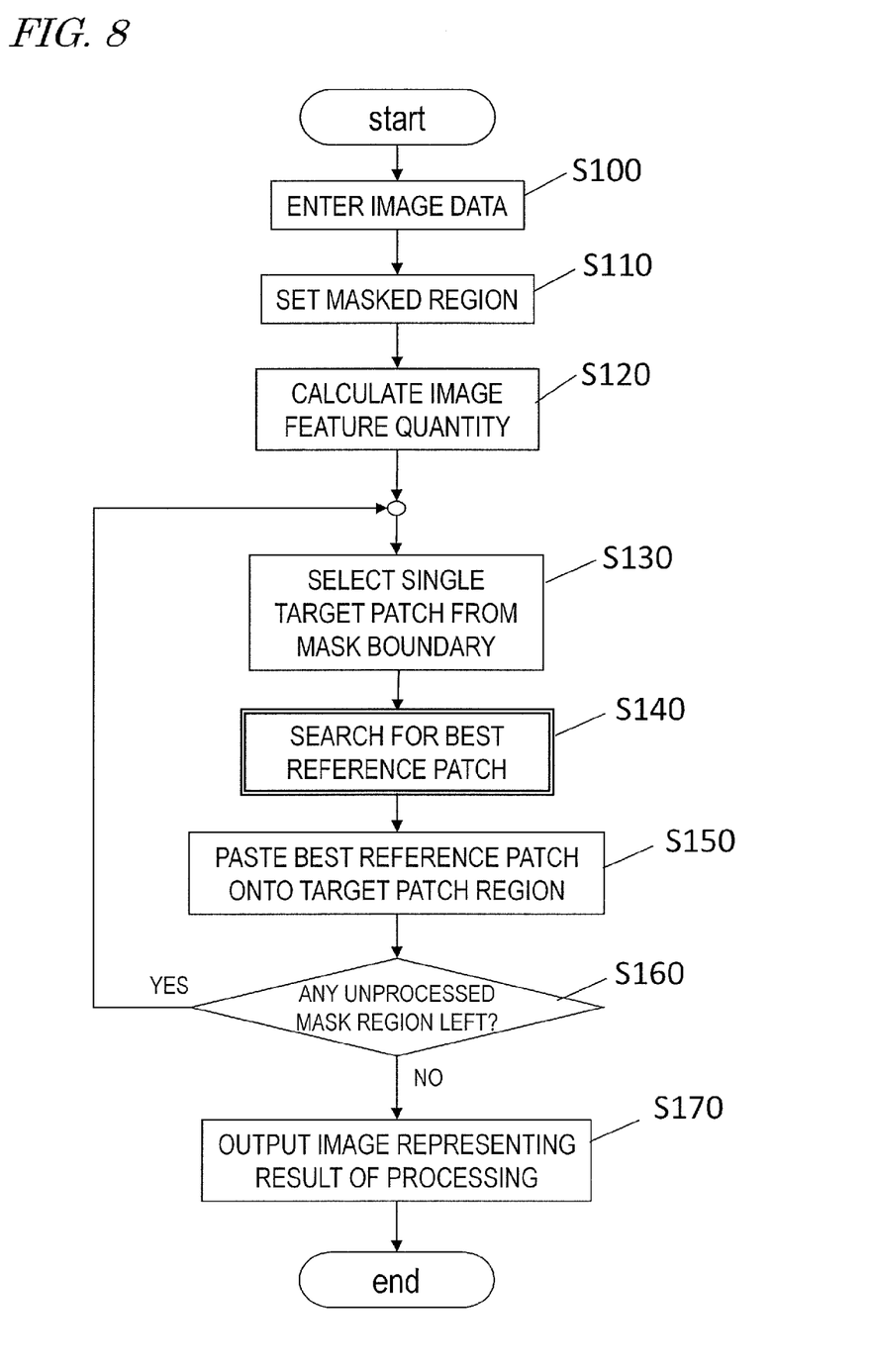
FIG. 8 A flowchart showing the overall processing flow according to an embodiment of the present disclosure.

FIG. 8 shows the overall processing flow of this embodiment. An exemplary flow of overall processing according to this embodiment will now be described with reference to FIG. 8.

First of all, image data to be processed is loaded (in Step S100).

Next, a masked region, from which an unnecessary object is going to be removed, is set (in Step S110). The region may be either manually selected and set by the user or automatically set by image recognition technique.

Subsequently, an image feature quantity indicating the degree of flatness of a texture is calculated based on the input image (in Step S120).

Thereafter, a point on the boundary between the masked region and the non-masked region is selected, and a region, of which the center is defined by that point, is selected as a target patch (in Step S130).

Then, the best patch to be pasted onto the target patch is selected (in Step S140) as will be described in detail later with reference to FIG. 9.

Next, the pixel values of the best patch selected are pasted onto the target patch region, and the masked region belonging to the target patch that has been subjected to the interpolation processing is updated into a non-masked region (in Step S150).

And the decision is made whether or not there is any masked region left (in Step S160). If the answer is YES, the process goes back to the processing step S130. On the other hand, if every masked region has already been processed, an image representing the result of this processing is output to a storage medium or display (not shown) through the output IF 150 to end the process (in Step S170).

Figure 9:
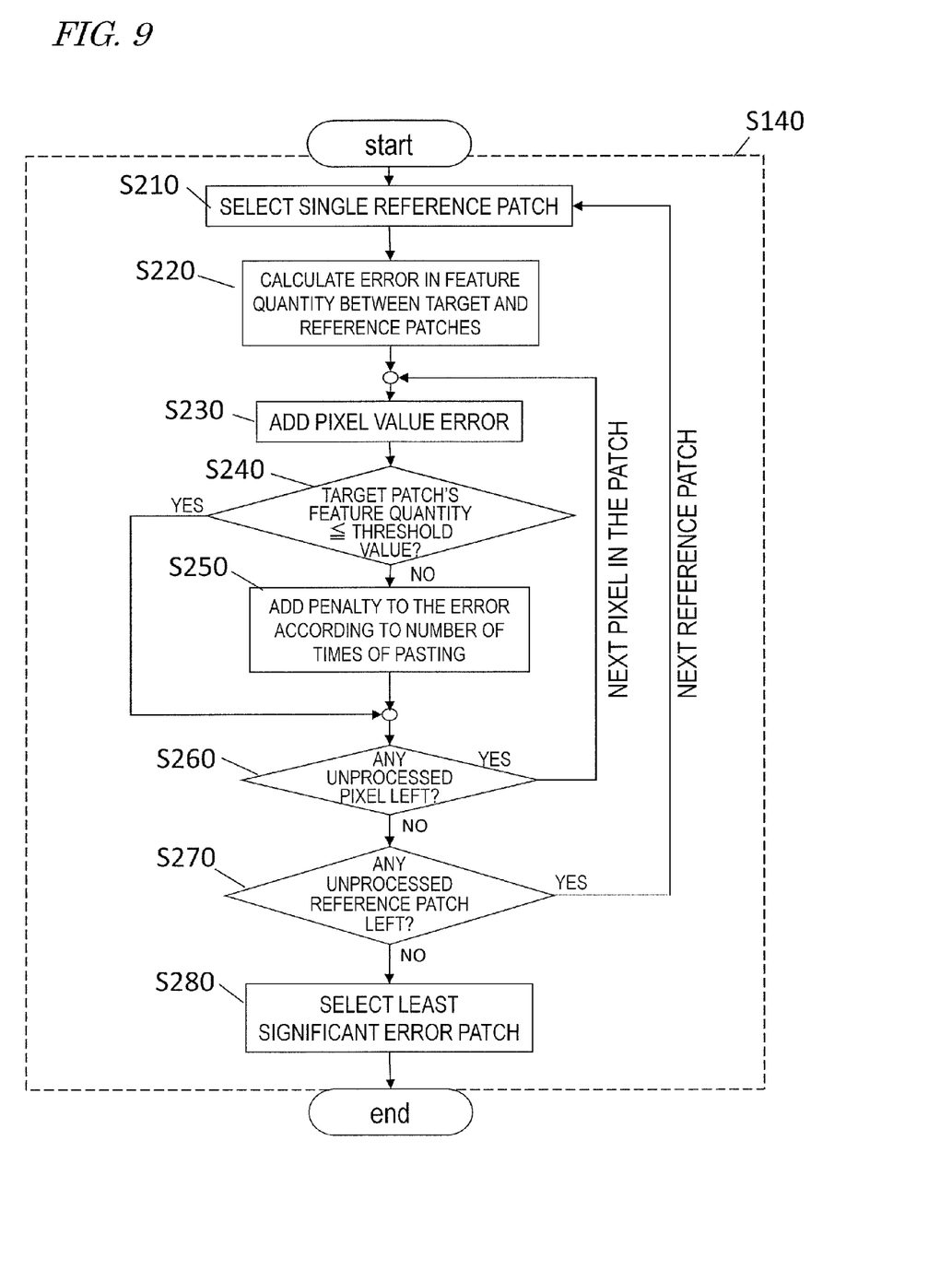
FIG. 9 A flowchart showing the procedure of best patch search processing according to an embodiment of the present disclosure.

FIG. 9 shows the flow of best patch search processing according to this embodiment. An exemplary flow of the best patch search processing according to this embodiment will be described below with reference to FIG. 9.

In this best patch search processing S140, a reference patch is selected as the best patch to be pasted onto the target patch that has been selected in the previous processing step S130.

First of all, a reference patch, for which an error with respect to the target patch is going to be calculated, is selected from the region surrounding the target patch (in Step S210).

Next, the error in image feature quantity between a non-masked region in the target patch and the entire reference patch that has been selected in Step S210 is calculated (in Step S220).

In the processing steps S230 to S250 that follow the processing step S220, comparison will be made on a pixel-by-pixel basis within the patches.

First, an error between each pixel of the target patch and its associated pixel of the reference patch is obtained (in Step S230). The error value is multiplied by a preset weight, and their product is added to the image feature quantity error value that has been obtained in the processing step S220. It should be noted that the error value is not calculated for pixels that form the masked region in the patch to be compared.

Next, the decision is made, based on the image feature quantity of a region included in the target patch, whether the texture of that region is flat or not (in Step S240). If the answer is YES, the process skips the next processing step S250 and jumps to the processing step S260. Otherwise, the process advances to the processing step S250.

In Step S250, reference is made to the number of times that the reference patch has ever been pasted, and a penalty value is determined according to the number of times and added to the image feature quantity error value that has been obtained in the processing step S220.

Subsequently, the decision is made whether or not there is any unprocessed pixel left in the patch (in Step S260). If any, the process goes back to the processing step S230. On the other hand, if comparison has already been made for every pixel, the process advances to the processing step S270.

In Step S270, the decision is made whether or not there is any patch yet to be compared. If any, the process goes back to the processing step S210 to compare the next unprocessed patch. On the other hand, if comparison has already been made for every patch, the process advances to the processing step S280.

Finally, a reference patch, of which the sum of the errors with respect to the target patch is the least significant, is selected (in Step S280), and the result is returned.

According to such an configuration, by referring to the image feature quantity in the non-masked region of the reference patch in selecting the best patch to paste, unnatural interpolation can be avoided and the quality of the result of interpolation can be improved. In addition, by referring to the number of times that a patch has ever been pasted, it is possible to avoid a situation where the same patch is pasted over and over again, and eventually, the quality of the result of interpolation can be improved.

The image interpolation apparatus 100 of the embodiment described above includes not only the pixel value error calculation processing unit 101 but also both of the feature quantity error calculation processing unit 105 and the number of times of pasting estimation processing unit 106. However, if the apparatus includes one of the feature quantity error calculation processing unit 105 and the number of times of pasting estimation processing unit 106, an effect that has never been achieved by any conventional image interpolation apparatus can be achieved. Consequently, the image interpolation apparatus or image processing apparatus of the present disclosure needs to include at least one of the feature quantity error calculation processing unit 105 and the number of times of pasting estimation processing unit 106.

Optionally, an image interpolation apparatus according to the present disclosure may also be implemented as a computer program which is designed to make either a known electronic device or a computer or a processor built in the electronic device perform the following processing steps. In that case, the program will be installed in a memory and will be used in combination with a known image processing apparatus. The program makes the image processing apparatus perform the steps of: (i) receiving image data and information defining a masked region of the image data to be subjected to interpolation processing and calculating an error on the image data between a patch to be interpolated that overlaps with the masked region and a reference patch that does not overlap with the masked region; (ii) calculating, based on the image data, feature quantities indicating the degrees of flatness of the respective patch regions; (iii) calculating an error between their feature quantities; (iv) selecting a reference patch that has produced the least significant error based on results obtained in the steps (i) and (iii); (v) pasting pixel data of the reference patch that has been selected in the step (iv) onto the patch to be interpolated; and (vi) generating resultant image data as a result of the interpolation processing. The step (iii) includes making the image processing apparatus calculate the error between their feature quantities by comparing the feature quantity of the patch to be interpolated outside of the masked region to the feature quantity of the entire reference patch.

INDUSTRIAL APPLICABILITY

An image interpolation apparatus according to the present disclosure can be used effectively as a function to be incorporated into an image shooting device such as a digital still camera, and can also be used in an image editing application for PCs, smartphones and other devices as well.

REFERENCE SIGNS LIST 100 image interpolation apparatus
101 pixel value error calculation processing unit
102 least significant error patch selection processing unit
103 best patch pasting processing unit
104 feature quantity calculation processing unit
105 feature quantity error calculation processing unit
106 number of times of pasting estimation processing unit
110 image input section
111 mask information input section
112 image output section
113 updated image
114 updated mask
115 number of times of pasting
200 conventional image interpolation apparatus
300, 400, 501 masked region
301 non-masked region
302 mask boundary
310, 410, 503, 602, 612, 702, 705 target patch
320, 321, 322, 420, 430, 504, 603, 613, 703, 704 reference patch
401, 502 texture region
411 target patch's in-mask part
412 target patch's out-of-mask part
421, 431 reference patch's in-mask part
422 reference patch's out-of-mask part
604, 614 number of times of pasting
605, 615 reference link
700 input image

The invention claimed is:

1. An image interpolation apparatus comprising a processor configured to:
receive image data and information defining a masked region of the image data to be subjected to interpolation processing;
calculate a first error, wherein the first error comprises an error on the image data between a patch to be interpolated that overlaps with the masked region and a reference patch that does not overlap with the masked region;
calculate, based on the image data, feature quantities indicating the degrees of flatness of the patch to be interpolated and the reference patch;
calculate a second error, wherein the second error comprises an error between the feature quantities by comparing the feature quantity of the patch to be interpolated outside of the masked region to the feature quantity of the entire reference patch;
select a reference patch that has produced a least significant error based on the first error and the second error;
paste pixel data of the selected reference patch onto the patch to be interpolated; and
an image output section which outputs resultant image data obtained as a result of the interpolation processing.

2. The image interpolation apparatus of claim 1, wherein:
the processor is further configured to count how many times pasting has been made inside the reference patch and which awards a penalty to a region where pasting has been made a significant number of times so that a third error, representing an error between the reference patch and the patch to be interpolated, widens in that region, the selecting the reference patch that has produced the least significant error is performed based on the first error and at least one of the second error and the third error.

3. The image interpolation apparatus of claim 2, wherein the processor is configured to change the penalty value according to a feature quantity indicating the degree of texture flatness of the reference patch.

4. The image interpolation apparatus of claim 2, wherein the selecting the reference patch that has produced the least significant error is performed based on the first error and the third error.

5. The image interpolation apparatus of claim 2, wherein the selecting the reference patch that has produced the least significant error is performed based on the first error, the second error, and the third error.

6. An image processing apparatus which performs the steps of:
(i) receiving image data and information defining a masked region of the image data to be subjected to interpolation processing and calculating an error on the image data between a patch to be interpolated that overlaps with the masked region and a reference patch that does not overlap with the masked region;
(ii) calculating, based on the image data, feature quantities indicating the degrees of flatness of the patch to be interpolated and the reference patch;
(iii) calculating an error between the feature quantities by comparing the feature quantity of the patch to be interpolated outside of the masked region to the feature quantity of the entire reference patch;
(iv) selecting a reference patch that has produced a least significant error based on results obtained in the steps (i) and (iii);
(v) pasting pixel data of the reference patch that has been selected in the step (iv) onto the patch to be interpolated; and
(vi) generating resultant image data as a result of the interpolation processing.

7. The image processing apparatus of claim 6, wherein the image processing apparatus further performs the step of counting how many times pasting has been made inside the reference patch and awarding a penalty to a region where pasting has been made a significant number of times so that the error between the reference patch and the patch to be interpolated widens in that region,
wherein the step (iv) includes selecting a reference patch that has produced the least significant error based on the results obtained in the steps (i) and (iii) and the penalty.

8. An image interpolation method comprising the steps of:
(i) receiving image data and information defining a masked region of the image data to be subjected to interpolation processing and calculating an error on the image data between a patch to be interpolated that overlaps with the masked region and a reference patch that does not overlap with the masked region;
(ii) calculating, based on the image data, feature quantities indicating the degrees of flatness of the patch to be interpolated and the reference patch;
(iii) calculating an error between the feature quantities by comparing the feature quantity of the patch to be interpolated outside of the masked region to the feature quantity of the entire reference patch;
(iv) selecting a reference patch that has produced a least significant error based on results obtained in the steps (i) and (iii);
(v) pasting pixel data of the reference patch that has been selected in the step (iv) onto the patch to be interpolated; and
(vi) generating resultant image data as a result of the interpolation processing.

9. The image interpolation method of claim 8, further comprising the step of counting how many times pasting has been made inside the reference patch and awarding a penalty to a region where pasting has been made a significant number of times so that the error between the reference patch and the patch to be interpolated widens in that region,
wherein the step (iv) includes selecting a reference patch that has produced the least significant error based on the results obtained in the steps (i) and (iii) and the penalty.

* * * * *